G. E. WHEELER.
BUTTER SEPARATOR.
APPLICATION FILED OCT. 24, 1913.

1,093,751.

Patented Apr. 21, 1914.
2 SHEETS—SHEET 1.

Witnesses

George E. Wheeler,
Inventor by C. A. Snow & Co.
Attorneys

G. E. WHEELER.
BUTTER SEPARATOR.
APPLICATION FILED OCT. 24, 1913.
1,093,751.
Patented Apr. 21, 1914.
2 SHEETS—SHEET 2.
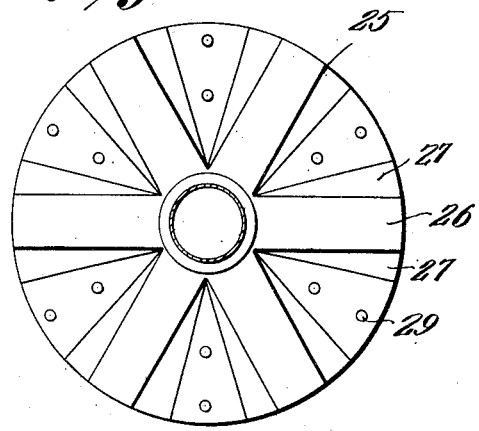
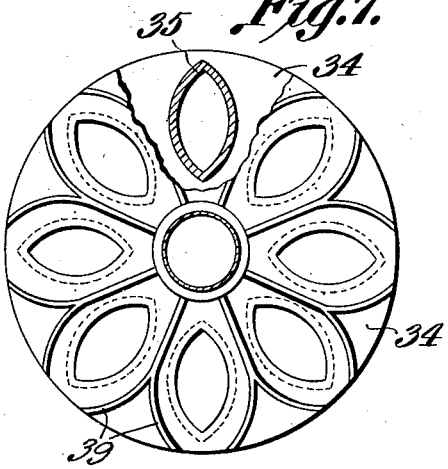
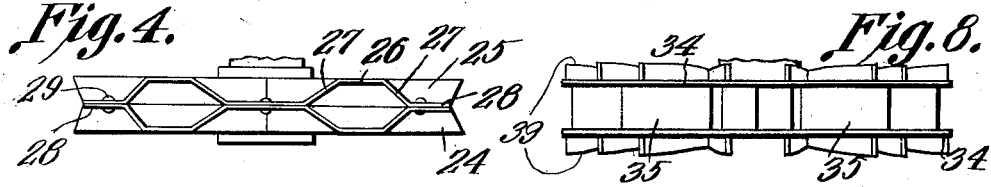
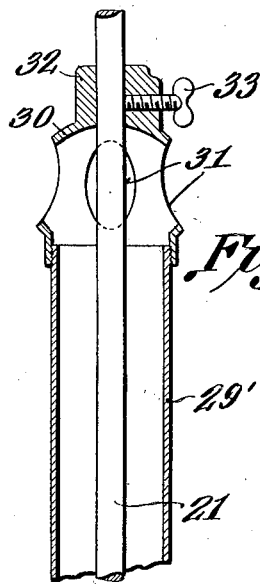
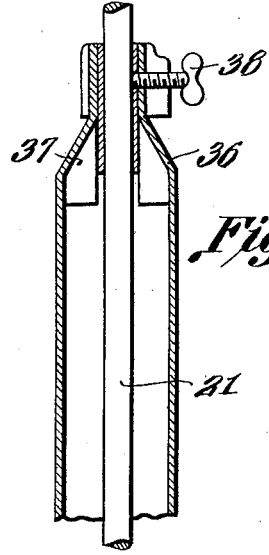
George E. Wheeler,
Inventor
by C. A. Snow & Co.
Attorneys
Witnesses

UNITED STATES PATENT OFFICE.

GEORGE E. WHEELER, OF BURLINGTON, IOWA, ASSIGNOR TO THE BURLINGTON SEPARATOR CO., OF BURLINGTON, IOWA, A CORPORATION OF IOWA.

BUTTER-SEPARATOR.

1,093,751.  Specification of Letters Patent. Patented Apr. 21, 1914.

Application filed October 24, 1913. Serial No. 797,086.

*To all whom it may concern:*

Be it known that I, GEORGE E. WHEELER, a citizen of the United States, residing at Burlington, in the county of Des Moines and State of Iowa, have invented a new and useful Butter-Separator, of which the following is a specification.

This invention relates to butter separators of that type utilizing means for aerating the cream or milk in the formation of butter, one of the objects of the invention being to simplify and otherwise improve upon separators of this type such as heretofore devised by providing means whereby an increased circulation of air downwardly into the cream or milk is produced by the rotation of the dasher and whereby the aeration of the milk or cream is rendered more efficient by a better distribution of the down flowing air through the body of liquid.

A further object is to provide a butter separator having means whereby the dasher can be easily removed and whereby the dasher can be readily adjusted vertically so as to bring it to any desired position within the container of the separator and, upon the completion of the formation of butter, to lower it within the container to permit the butter to be removed from above the dasher.

A further object is to provide a separator having improved means for facilitating the admission of air thereto, the dasher being so shaped as to draw the air rapidly down to the deflecting angles of the disks of the dasher whereby to force the air out horizontally through the liquid.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred forms of the invention have been shown.

Figure 1:
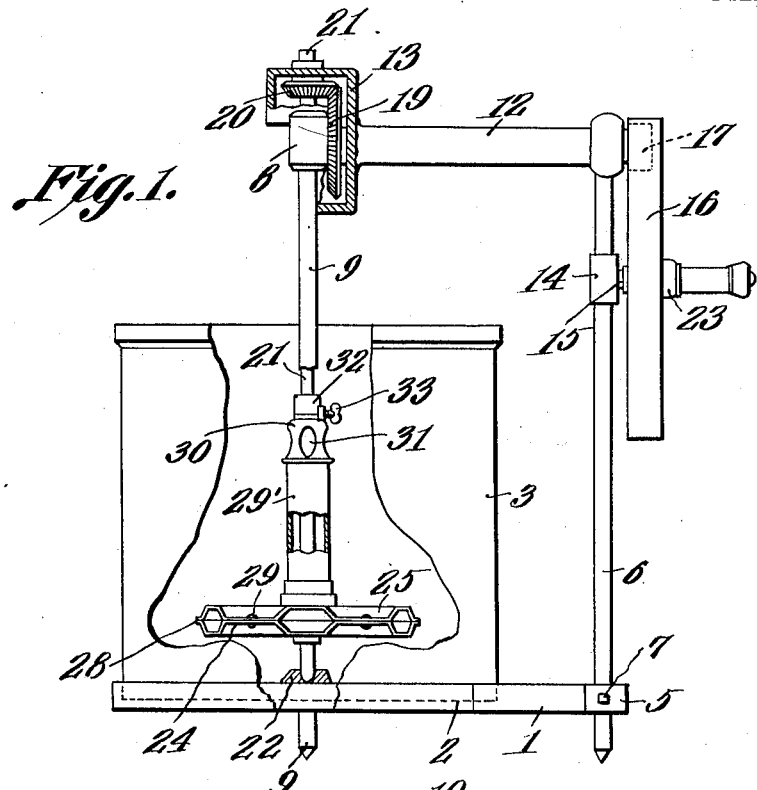
Figure 2:
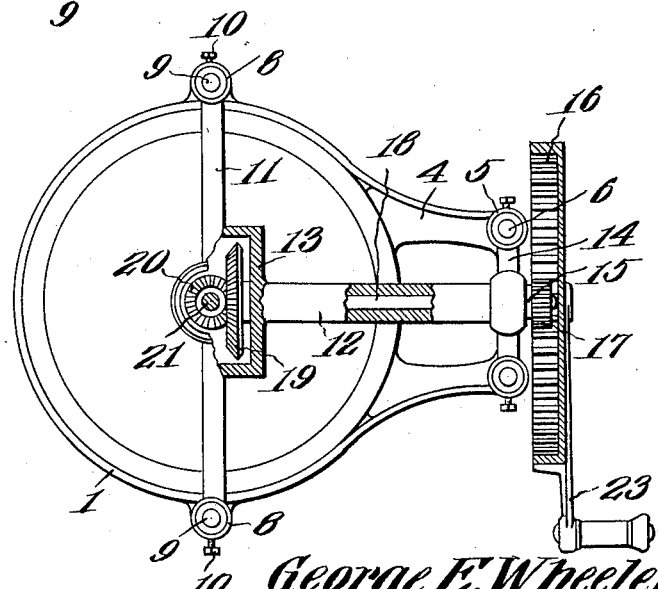

In said drawings:—Figure 1 is a view partly in section and partly in elevation of the separator. Fig. 2 is a view partly in plan and partly in section of the separator. Fig. 3 is a plan view of the dasher, the same being of a six flute type. Fig. 4 is an end view thereof. Fig. 5 is a section through the upper end portion of the tubular dasher stem. Fig. 6 is a similar view showing a modified form of dasher stem. Fig. 7 is a view partly in plan and partly in section of a modified form of dasher. Fig. 8 is an end view of the dasher shown in Fig. 7.

Referring to the figures by characters of reference 1 designates a base of any preferred form and this base is provided with a recess 2 of circular or other desired form and constituting a seat for the bottom of a container 3. A portion of the base is extended outwardly, as shown at 4 and may be provided with spaced eyes 5 adapted to receive standards 6. These standards are adjustable longitudinally within the eyes and can be securely held in any suitable manner, as by means of set screws 7 extending into the eyes or by means of pins fixedly mounted. Additional eyes 8 are provided upon the base 1 at diametrically opposed points and receive standards 9 which can also be adjusted longitudinally and which may be held against displacement in any desired manner, as by set screws 10, pins, or the like. The standards 9 are secured to the end portions of a cross bar 11 and a tubular arm 12 extends from a housing 13 formed on the cross bar, said arm being disposed at right angles to the bar.

Standards 6 extend upwardly to a cross strip 14 and then converge upwardly to the tubular arm 12, the said strip 14 having a stud 15 extending therefrom and on which is journaled an internal gear 16 meshing with a pinion 17. This pinion is secured to a shaft 18 journaled in the arm 12 and extending into housing 13, there being a bevel gear 19 within the housing and upon the shaft 18. This bevel gear meshes with a smaller gear 20 secured to a vertical shaft 21 which is journaled at its upper end in the top of housing 13 and at its lower end in a step bearing 22 formed on the center of the bottom of container 3.

Instead of utilizing the step bearing 22, the shaft 21 can be journaled solely within the housing 13 so as thus to be free of any supporting means within the container 3.

A crank arm 23 is connected to internal gear 16 and by means thereof said gear can be rotated so that motion will be transmitted through gear 17 and shaft 18 and gears 19 and 20 to shaft 21, the last named shaft thus being rotated at a high speed.

The dasher used in connection with the parts hereinbefore described consists of two opposed disks which can be like or unlike, as desired, stamped from sheet metal or cast, as preferred. It is to be understood that under some conditions it might be desired to use two opposed disks which are cast in one piece with the air passages cored out or may be made in any other suitable manner. The lower disk 24 and the upper disk 25 have registering channel portions formed in the meeting faces thereof and extending radially in the disks. These channeled portions form air deflecting angles, as shown particularly in Fig. 3, extending from points close to the centers of the disks and outwardly to the peripheries thereof, thus constituting radial passages to which air is supplied as hereinafter described and from which air will be discharged with great force in jets or in a continuous horizontal sheet during the rapid rotation of the dasher, the amount of air discharged being dependent upon the size of the passages. The meeting portions of the two disks can be held together in any preferred manner, as by means of rivets, solder or the like or, as before stated, the two disks can be cast in one piece. It is preferred to use from six to eight of these radial passages although it is to be understood that a smaller number may be employed in smaller machines while in very large machines a greater number can be used. It will be noted by referring to Fig. 4, that the grooves or channels in the two disks are of the same area and thus register exactly when in proper position one upon the other. If desired, however, the lower disk may have broad channels registering with the grooves in the upper disk. Furthermore it will be seen that the sides of the channels or grooves are inclined so that the corresponding walls of two registering channels will converge toward each other, whereby the outlet end of each passage formed by the disks is provided with six sides. It has been found, by actual tests, that by forming passages in this manner, a more efficient action of the air is produced in the operation of the dasher than can be had by the use of any other known form of dasher.

In Figs. 3 and 4 the grooves in the disks have been indicated at 26, the inclined walls at 27 and the meeting faces of the disks have been indicated at 28. Rivets for securing the disks together have been shown at 29.

Extending upwardly from and movable with the upper disk 25 is a tubular stem 29' spaced from the shaft 21 but concentric therewith, the upper end of the stem being secured within the lower end of a spherical head 30 having elliptical inlet ports 31 in the wall thereof, there being a tubular extension 32 at the upper end of the head which fits snugly on shaft 21 and is adapted to be secured adjustably thereto by means of a set screw 33. The lower disk 24 of the dasher fits snugly upon but is adapted to slide on the shaft 21.

It will be apparent that after the dasher has been adjusted longitudinally along shaft 21 so as to lie one or two inches below the surface of the liquid in the container 3, the said dasher can be rotated at a high speed by actuating gear 16 in the manner hereinbefore described. During the rotation of the dasher the air contained in the passages between the disks 24 and 25 will be thrown outwardly by centrifugal force in the form of jets, thus creating a suction downwardly through the stem 29' and the ports 31. The jets of air thus thrown outwardly will be distributed evenly within the liquid in the container and in rising will operate to separate the fatty globules and these globules will rise to the surface of the liquid and form butter as ordinarily.

It has been found by actual tests that by having the passages in the dasher with converging side walls, the air contained in the passages is thrown outwardly with greater force than would otherwise take place, this being particularly true where the passages are extended continuously from the periphery of the disk inwardly to points close to the center thereof. It has been found, furthermore, that by utilizing a spherical head 30 with the elliptical inlet ports 31, the air is free to enter the stem 29' with less resistance than by the use of any other construction heretofore used. By utilizing a dasher such as set forth it has been possible for me to complete the formation of butter in from thirty to fifty seconds after beginning the operation of the dasher.

Another form of dasher has been shown in Figs. 7 and 8 wherein instead of providing upper and lower disks with channels or grooves formed therein, either flat or corrugated upper and lower disks 34 are employed, these disks being spaced apart by substantially elliptical blocks 35, formed of solid or hollow pieces of wood, metal or any other suitable material and which produce passages between them, as shown. The operation of this structure is somewhat similar to that of the dasher shown in Figs. 3 and 4. This type of dasher may have three to eight or more passages, according to the size of the machine. As shown, the disks 34 are provided upon their outer faces with outwardly diverging wings or breakers 39 preferably curved so that, when the dasher is rotated in either direction, the liquid directly above and below the dasher will be engaged by the advancing convex faces of the wings and deflected outwardly away from the dasher. The blocks 35 are so shaped as to expel the air with equal efficiency when the dasher is rotated in either direction.

Instead of utilizing a spherical head at the upper end of the dasher stem, said upper end can be made conical as shown at 36 in Fig. 6 and angular openings 37 may be provided in this conical end and extended downwardly into the stem. This form of inlet opening will also permit air to enter the stem freely. In this construction the reduced upper end of the stem is held securely to the shaft 21 by means of a set screw 38, or the like.

What is claimed is:—

1. A butter separator including a container, a shaft extending thereinto, means for rotating the shaft in either direction, and a dasher revoluble with the shaft and including upper and lower disks having spaced portions forming non-communicating radial air passages extending from the centers of the disks to the peripheries thereof, a tubular stem projecting upwardly from one of the disks and concentric with the shaft, a spherical head at the upper end of the stem and having an air inlet port, and means for holding the dasher against sliding movement on the shaft, said dasher operating with equal efficiency, when rotated in either direction, for discharging air therefrom and into the container.

2. A butter separator including a container, a shaft extending thereinto, means for rotating the shaft, and a dasher revoluble with the shaft and including upper and lower disks having registering radial grooves forming non-communicating passages, the walls of the grooves being inclined, the corresponding walls of opposed grooves converging toward each other to pack air at one side of each passage during the rotation of the dasher and to discharge air radially from the passage in the form of a jet, said grooves extending from the centers to the peripheries of the disks, those portions of the disks between the grooves being in contact and connected together, a tubular stem projecting from the upper disk and concentric with the shaft, there being an air inlet at the upper end of the stem, and means carried by the stem for engaging the shaft to hold the dasher against sliding movement.

3. A butter separator including a container, a shaft extending thereinto, means for rotating the shaft, and a dasher revoluble with the shaft and including upper and lower disks having registering radial grooves forming non-communicating passages, the walls of the grooves being inclined, the corresponding walls of opposed grooves converging toward each other to pack air at one side of each passage during the rotation of the dasher and to discharge the air in a jet from the passage, said grooves extending from the centers to the peripheries of the disks, those portions of the disks between the grooves being in contact and connected together, a tubular stem projecting from the upper disk and concentric with the shaft, a spherical head at the upper end of the stem and having air inlets, said inlets being elliptical, and means above the head for engaging the shaft to hold the dasher against sliding movement on the shaft.

4. In a separator the combination with standards, driving mechanism supported thereby and a shaft actuated by the mechanism, of a base detachably and adjustably mounted on the standards, a container supported by the base, said shaft extending into the container, and a dasher revoluble with the shaft and in the container, said dasher including spaced disks fixedly connected and forming radial non-communicating passages therebetween extending from the center to the periphery of the disks, a tubular stem projecting upwardly from one of the disks and concentric with the shaft, said stem having an air inlet at its upper end, and means for holding the dasher against longitudinal movement upon the shaft.

In testimony that I claim the foregoing as my own, I have hereto affixed my signature in the presence of two witnesses.

GEORGE E. WHEELER.

Witnesses:
G. ROSE FRENCH,
MARGARET J. MERCER.

---

Copies of this patent may be obtained for five cents each, by addressing the "Commissioner of Patents, Washington, D. C."